(12) United States Patent
Cheng et al.

(10) Patent No.: US 7,394,653 B2
(45) Date of Patent: Jul. 1, 2008

(54) HEAT DISSIPATING SYSTEM OF MULTI-MEDIA COMPUTER

(75) Inventors: Jung-Hsiang Cheng, Taipei (TW); Andy Lin, Taipei (TW)

(73) Assignee: Shuttle Inc., Taipei (TW)

( * ) Notice: Subject to any disclaimer, the term of this patent is extended or adjusted under 35 U.S.C. 154(b) by 270 days.

(21) Appl. No.: 11/256,964

(22) Filed: Oct. 25, 2005

(65) Prior Publication Data
US 2007/0091561 A1 Apr. 26, 2007

(51) Int. Cl.
H05K 7/20 (2006.01)
F28F 7/00 (2006.01)
H05K 5/00 (2006.01)

(52) U.S. Cl. ............. 361/687; 361/695; 165/80.3; 454/184; 312/236

(58) Field of Classification Search ............ 361/687, 361/695, 696, 699, 700; 257/714, 712, 713, 257/722; 165/80.4, 80.5, 104.33, 80.3; 174/15.1, 174/15.2, 252, 16.1, 16.3; 454/184; 312/236
See application file for complete search history.

(56) References Cited

U.S. PATENT DOCUMENTS

| | | | |
|---|---|---|---|
| 5,600,538 A * | 2/1997 | Xanthopoulos | 361/683 |
| 6,504,529 B1 * | 1/2003 | Inagaki et al. | 345/168 |
| 6,654,242 B2 * | 11/2003 | Ogawa | 361/687 |
| 7,097,477 B1 * | 8/2006 | Felton et al. | 439/157 |
| 2005/0047107 A1 * | 3/2005 | Pan | 361/807 |
| 2005/0149654 A1 * | 7/2005 | Holloway et al. | 710/100 |
| 2006/0195710 A1 * | 8/2006 | Maeshima et al. | 713/320 |
| 2007/0076369 A1 * | 4/2007 | Chen et al. | 361/687 |

* cited by examiner

*Primary Examiner*—Jayprakash N Gandhi
*Assistant Examiner*—Zachary M Pape
(74) *Attorney, Agent, or Firm*—Muncy, Geissler, Olds & Lowe, PLLC

(57) ABSTRACT

A heat dissipating system of a multi-media computer includes a computer case, a first heat dissipating area, and a second heat dissipating area. The first heat dissipating area is formed on an inner side of the computer case, wherein a hard disk driver, a video graphics card, and a TV tuner card are installed therein. The second heat dissipating area is formed on the other inner side of the computer case, wherein a power supply module is installed therein. Heat flows are formed in the first heat dissipating area and the second heat dissipating area respectively.

21 Claims, 6 Drawing Sheets

HEAT DISSIPATING SYSTEM OF MULTI-MEDIA COMPUTER

BACKGROUND OF THE INVENTION

1. Field of the Invention

The present invention relates to a heat dissipating system of a multi-media computer, and particularly relates to a heat dissipating system installed inside a computer.

2. Description of the Related Art

With the coming of the diversified information generation, high technology products with various functions are continuously integrated into a computer. For example, a multi-media computer is not only a computer system but also has a recording-video digital versatile disk (DVD). The computer is installed with varies electric devices and peripheral devices, and the computer is almost closed by a nearly sealed case. However, heat is generated when the electric and peripheral devices are operated. Therefore, how to efficiently eliminate the heat sources from inside the computer is an urgent and necessary subject today.

Recently, a popular way to resolve the heat problem mentioned above is to install a heat sink device comprising a heat sink and a fan near the electronic and peripheral devices in order to reduce the ambient temperature of the computer, the electric devices, and the peripheral devices by the heat sink device.

By utilizing the fan installed on the rear plate of the computer case, the atmosphere flows between the heat sink device and the external environment. In addition, heat is eliminated to the external environment through holes open through the rear plate by the heat sink device installed on the CPU and a chip and/or the fan installed near a hard disk, interface cards, and a power supplier. However, the CPU, the chip, and the peripheral devices are all installed inside the computer case, such that heat generated by each of those devices, which each respectively produce various amount of heat, gathers inside the computer case. Furthermore, a greenhouse effect occurs due to a lot of heat sources being reduced in the same environment. Thus, cold air from the external environment cannot reach the the CPU, the chip, the hard disk drive, the interface cards, and the power supplier, and remove the heat generated by electric devices during operation thereof.

SUMMARY OF THE INVENTION

The present invention provides a heat dissipating system of a multi-media computer, such that each main heat source is installed in a different heat dissipating area in order to induce the external atmosphere into the computer case and eliminate the heat along a short path. Therefore, the heat dissipating efficiency of the computer case is greatly improved.

Accordingly, the heat dissipating system of a multi-media computer of the present invention includes a computer case, a first heat dissipating area, and a second heat dissipating area. The first heat dissipating area is formed on an inner side of the computer case, wherein a hard disk drive, a video graphics card, and a TV tuner card are installed therein. The second heat dissipating area is formed on the other inner side of the computer case, wherein a power supply module is installed therein. Heat flows are formed in the first heat dissipating area and the second heat dissipating area respectively.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

The following provides exemplary embodiments of the present invention with reference to the accompanying drawings.

In FIGS. 1 through 4, the prevent invention provides a heat dissipating system of a multi-media computer comprising a computer case 10, a first heat dissipating area 20, and a second heat dissipating area 30.

Figure 1:
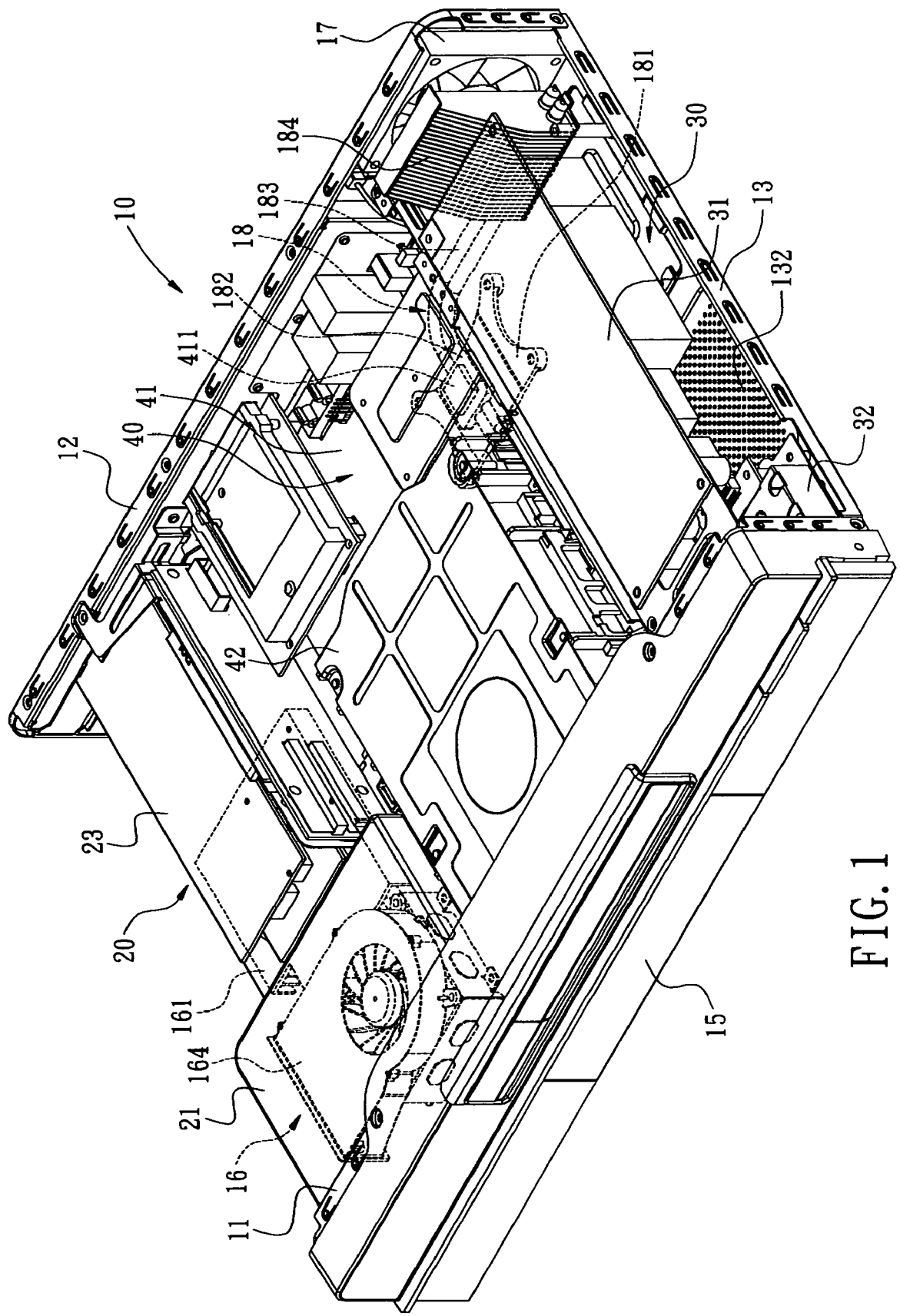
FIG. 1 is a perspective view of a computer according to the prevent invention.
Figure 2:
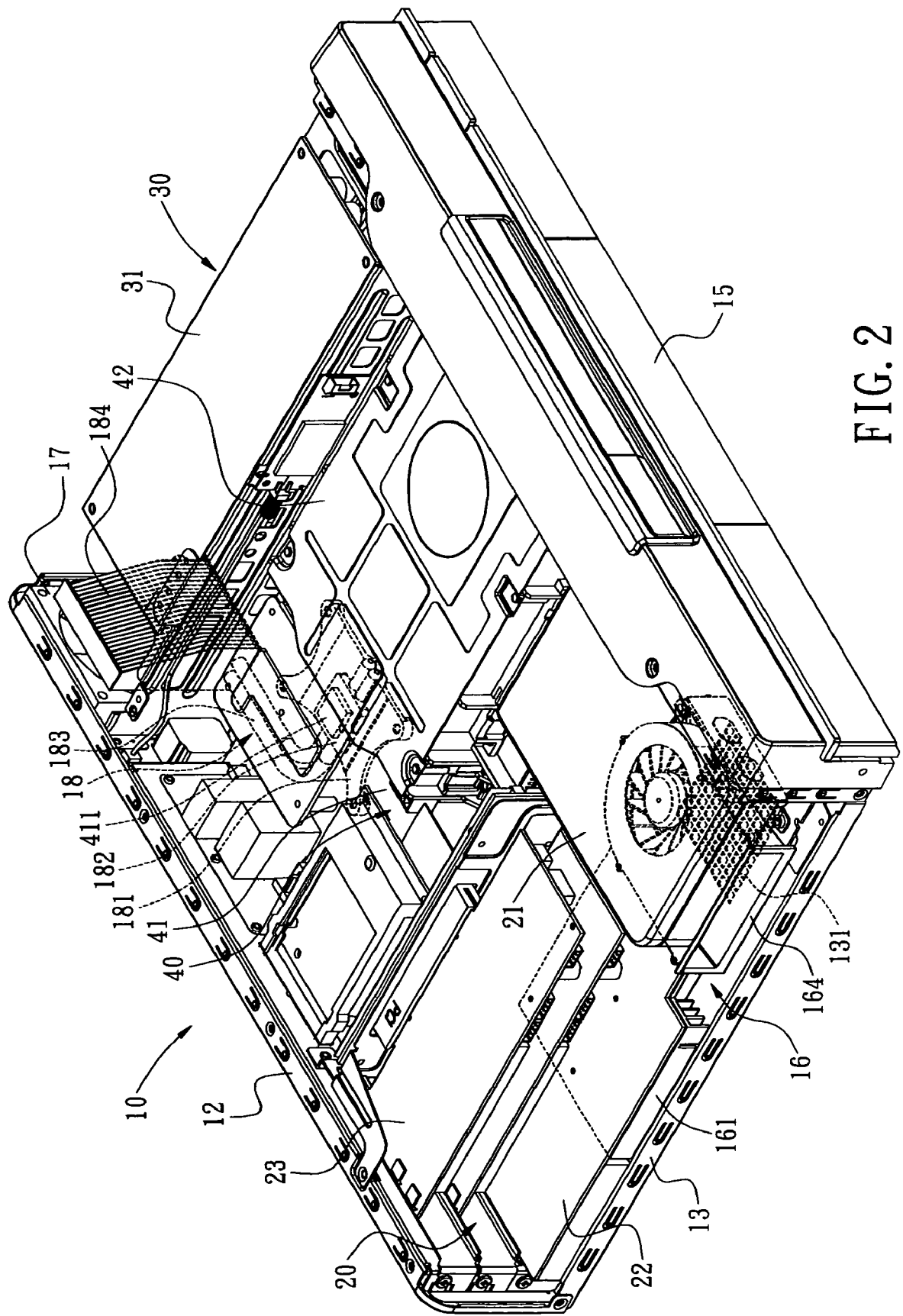
FIG. 2 is a another perspective view of a computer according to the present invention.
Figure 3:
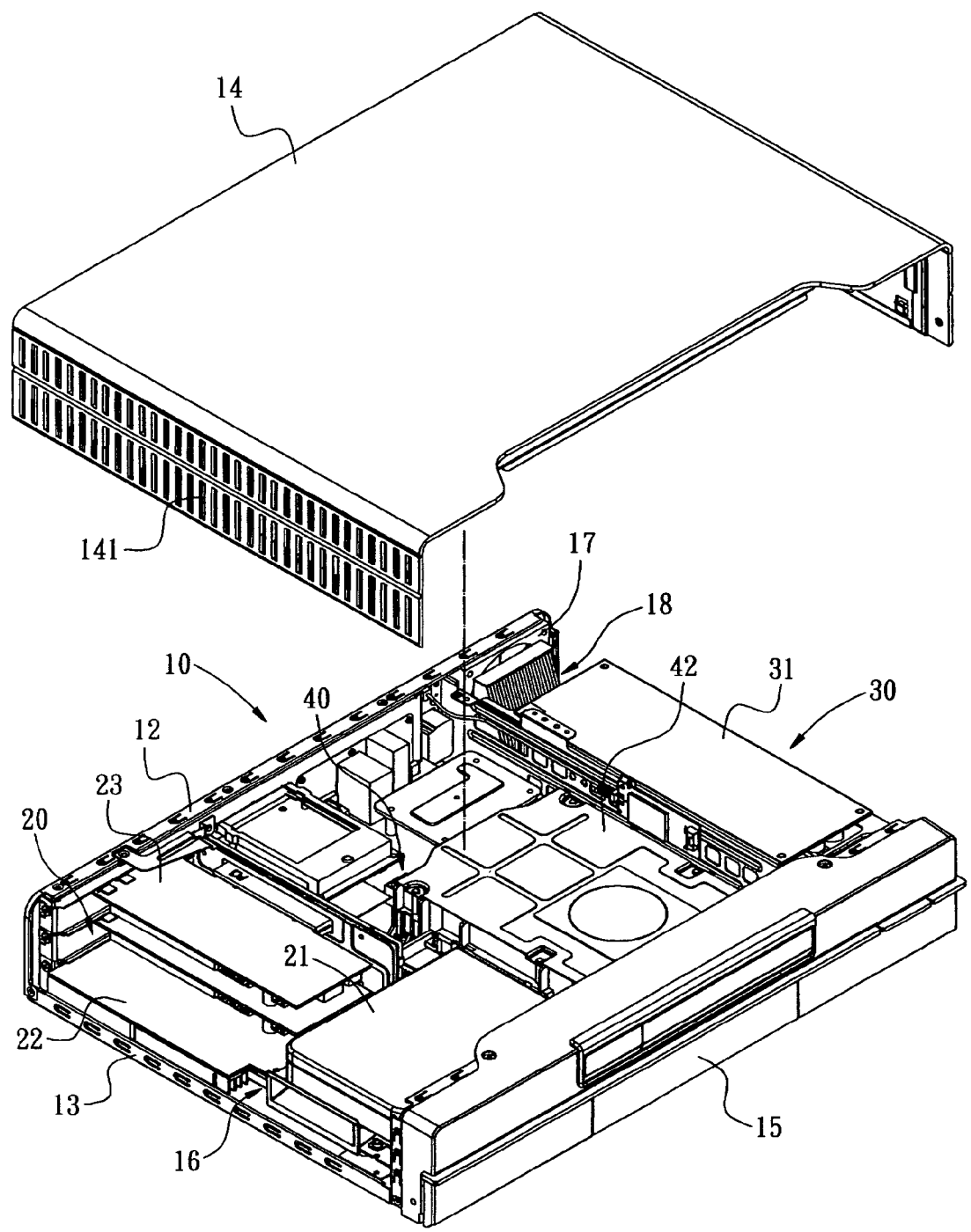
FIG. 3 is a decomposed schematic view of a computer and a cover according to the present invention.
Figure 4:
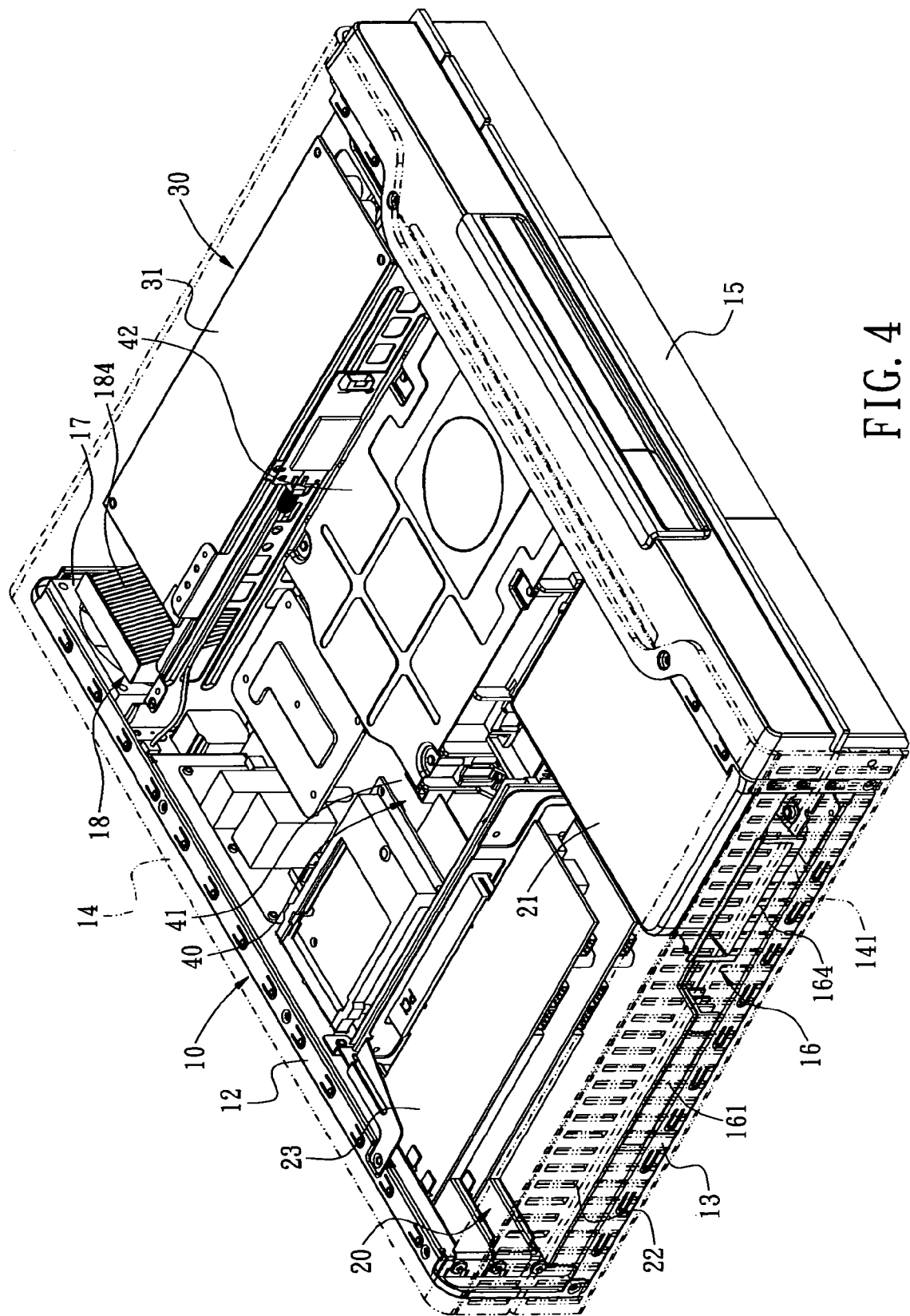
FIG. 4 is a combined schematic view of a computer and a cover according to the present invention.

The computer case 10 comprises a front plate 11 with a plurality of through holes installed corresponding to electric devices inside the computer cases 10, a rear plate 12 parallel to and behind the front plate 11 with a certain distance, a base plate 13 connected in the bottom of the front plate 11 and the rear plate 12, and a cover 14 with a U shape (as shown in FIG. 3). The cover 14 covers on the top of the front plate 11, rear plate 12, and base plate 13. Furthermore, a panel 15 is installed in front of the front plate 11 for improving the artistic and entire design.

Figure 5:
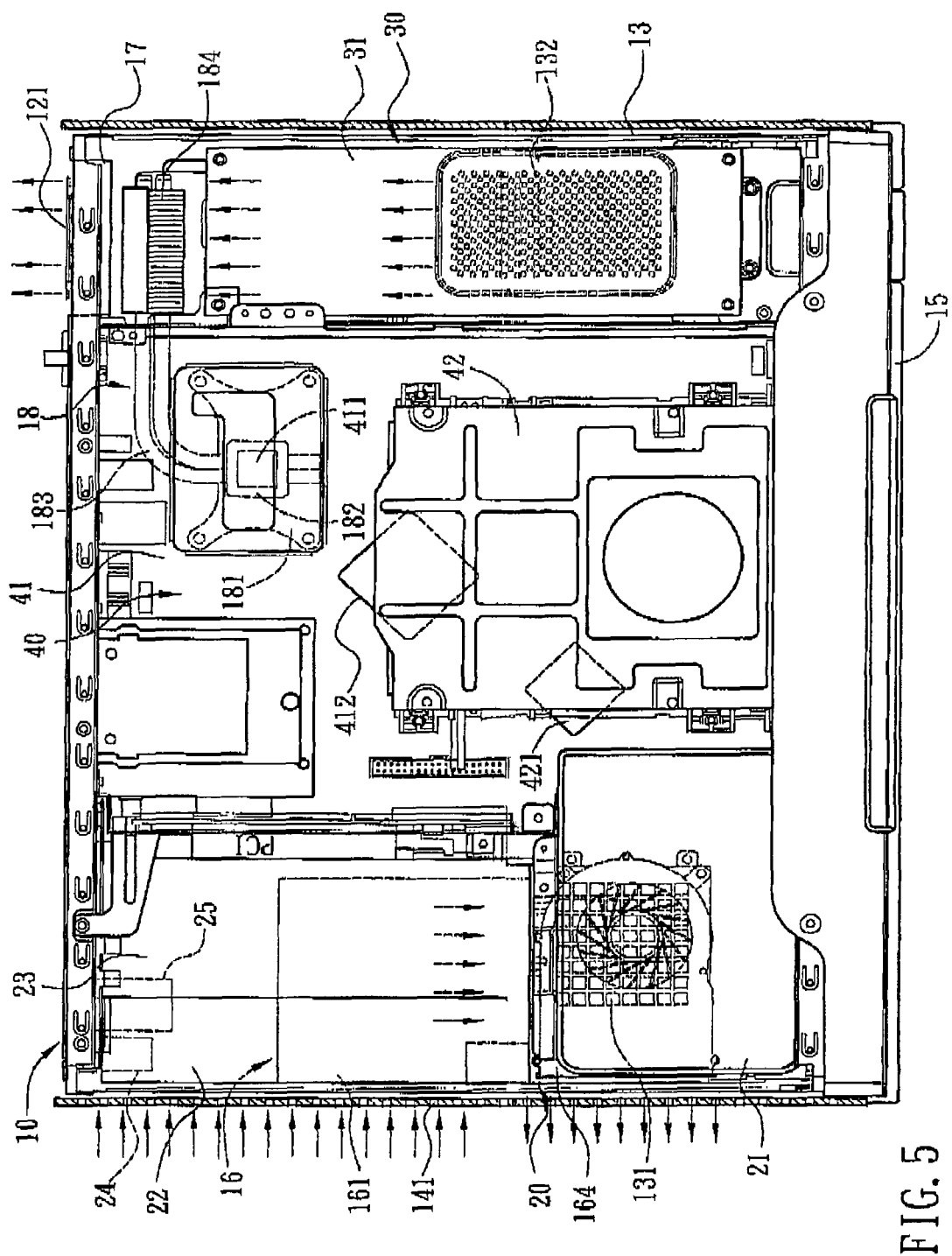
FIG. 5 is a schematic view illustrating a computer combined with a cover in a first using state according to the prevent invention.

The first heat dissipating area 20 is formed on an inner side of the computer case 10. For example, in the preferred embodiment, the first heat dissipating area 20 is formed on the left side of the computer case 10 in view of and facing the panel 15, wherein electric devices, such as a hard disk drive 21 with 3.5 inches, a video graphics card (VGA) 22, a TV tuner card 23, a USB interface slot 24, and a memory module 25 (as shown in FIG. 5), are disposed in the first heat dissipating area 20. In the first heat dissipating area 20, a first vent 131 is formed on left side of the base plate 13 of the computer case 10 corresponding to the first heat dissipating area 20, and a plurality of slots 141 parallel to each other are formed on the left side of the cover 14. A first heat sink module 16 comprising a heat sink device 161, a plurality of heat pipes 162 joined through the heat sink device 161 (as shown in FIG. 6), a plurality of heat sinks 163 connected to with the heat pipes 162 in series, and a first fan 164 mounted on the heat sink 163 is installed on the first vent 131.

The second heat dissipating area 30 is formed on the other inner side of the computer case 10, wherein a power supply module 31 standing upside down and a removable hard disk module 32 with 2.5 inches are disposed on the second heat dissipating area 30. In the second heat dissipating area 30, a series of gate-shaped holes 121 (as shown in FIG. 5) are formed on the rear plate 12 of the computer case 10, and a second vent 132 is formed on the base plate 13 of the computer case 10. A second fan 17 is installed in front of the gate-shaped holes 121.

In addition, the present invention further comprises a third heat dissipating area 40 formed in the central area of the computer case 10 between the first heat dissipating area 20 and the second heat dissipating area 30. A mother board 41 and an optical disk drive 42 connected on the top of the mother board 41 are installed on the third heat dissipating area 40. In the third heat dissipating area 40, a CPU 411, a north bridge and south bridge chip set 412 (as shown in FIG. 5) are installed opposite the disk player 42 on the back side of the mother board 41. The memory module 25 (as shown in FIG. 5) is further connected with the mother board 41, and through holes (not shown) are formed respectively corresponding to the CPU 411 and the memory module 25 in the third heat dissipating area 40 for the convenience of exchanging electric devices. A second heat sink module 18 comprising a fixing holder 181, a heat bulk 182, a plurality of heat pipes 183 joined through the heat bulk 182, and a heat sink 184 connected with the heat pipes 183 is series is installed on the CPU 411. The fixing holder 181 is used for flatly fixing the heat bulk 182 on the CPU 411, and the heat sink 184 is installed on the inner side of the second fan 17.

Figure 6:
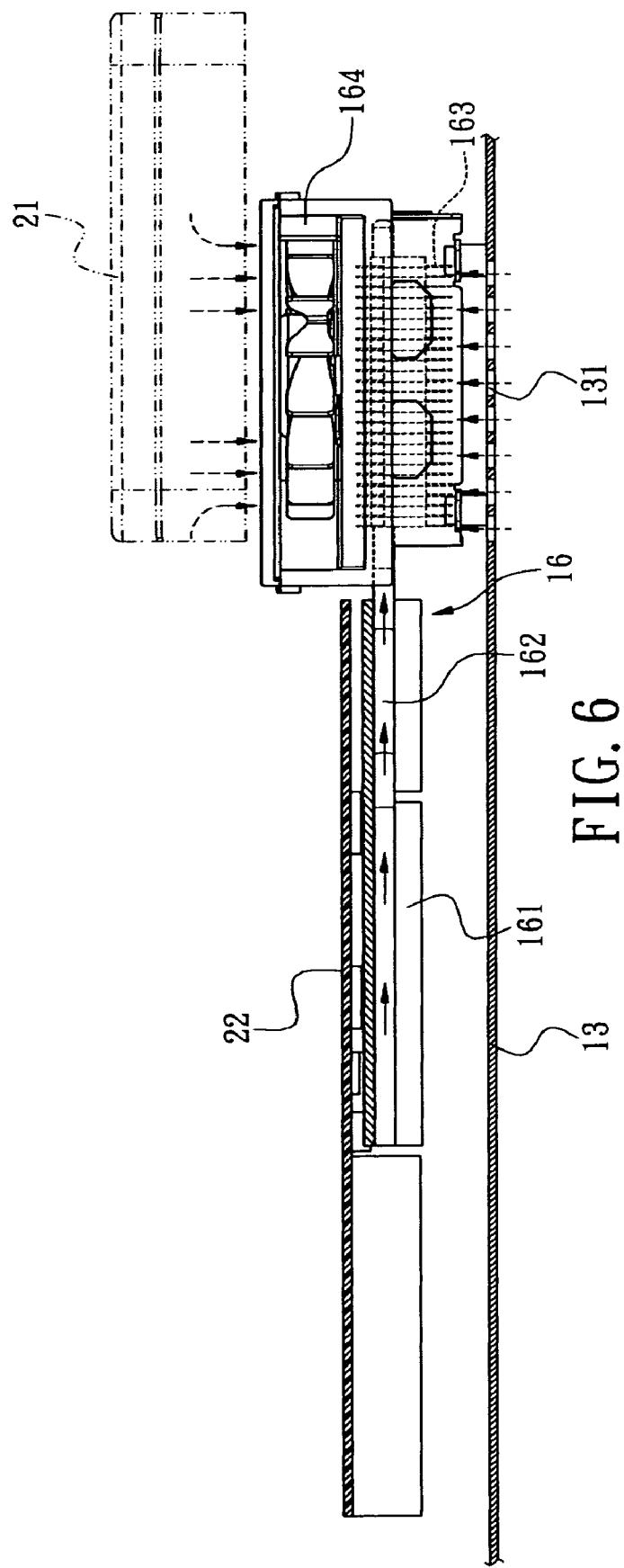
FIG. 6 is a schematic drawing illustrating a computer combined with a cover in a second using state according to the prevent invention.

In FIGS. 5 and 6, after the computer begins to operate, a heat flow in the first heat dissipating area 20 is designed as following. The external atmosphere is absorbed through the slots 141 behind the cover 14 and the first vent 131 of the base plate 13 and enters into the left side of the computer case 10, such that the heat generated by the hard disk drive 21, the video graphics card (VGA) 22, the TV tuner card 23, and other electric and peripheral devices during operation is eliminated by the first fan 164 of the first heat sink module 16 from the slots 141 in front of the cover 14 to the outside of the computer case 10. A heat flow in the second heat dissipating area 30 is designed as following. The external atmosphere is absorbed through the second vent 132 of the base plate 13 and enters into the side of the computer case 10, such that the heat generated by the power supply module 31, removable hard disk module 32, and other electric and peripheral devices during operation is brought out by the second fan 17 from the gate shaped holes 121 of the rear plate 12 to the outside of the computer case 10. A heat flow in the third heat dissipating area 40 is designed as following. The heat generated by the CPU 411 during operation is transferred by the second fan 17 through the heat bulk 182, the heat pipe 183, and the heat sink 184 in turn. The heat is subsequently taken away through the gate-shaped holes 121 to the outside of the computer case 10.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A heat dissipating system of a multi-media computer, comprising:
    a computer case having a front plate, a rear plate, a base plate, and a cover;
    a first heat dissipating area, formed on an inner side of the computer case, having a hard disk drive, a video graphics card, and a TV tuner card installed therein;
    a second heat dissipating area, formed on the other inner side of the computer case, having a power supply module installed therein;
    a USB (universal series bus) interface slot, installed in the first heat dissipating area;
    a memory module, installed in the first heat dissipating area;
    a plurality of first vents, formed through the base plate of the computer case in the first heat dissipating area, wherein a first heat sink module is installed on the first plurality of vents; and
    a plurality of slots, formed through a left side of the cover of the computer case in view of facing the front plate in the first heat dissipating area;
    wherein heat flows are formed in the first heat dissipating area and the second heat dissipating area respectively.

2. The system as claimed in claim 1, further comprising:
    a removable hard disk module, installed in the second heat dissipating area;
    a plurality of second vents, formed through the base plate of the computer case in the second heat dissipating area; and
    a plurality of gate-shaped holes, formed through the rear plate of the computer case in the second heat dissipating area, wherein a second fan is installed in front of the gate-shaped holes.

3. The system as claimed in claim 1, wherein the power supply module is installed upside down.

4. The system as claimed in claim 1, further comprising:
    a third heat dissipating area, formed inside the computer case between the first heat dissipating area and the second heat dissipating area.

5. The system as claimed in claim 4, wherein the third heat dissipating area has a mother board and a disk player connected on the top of the mother board.

6. The system as claimed in claim 5, wherein a chip set and a CPU are installed on the mother board opposite to the disk player.

7. The system as claimed in claim 6, wherein a second heat sink module has a fixing frame, a heat bulk, a heat pipe, and a plurality of heat sinks is installed on the CPU, and the heat bulk is flatly fixed on the CPU by the fixing frame.

8. A heat dissipating system of a multi-media computer, comprising:
    a computer case having a front plate, a rear plate, a base plate, and a cover;
    a first heat dissipating area, formed on an inner side of the computer case, having a hard disk drive, a video graphics card, and a TV tuner card installed therein;
    a second heat dissipating area, formed on the other inner side of the computer case, having a power supply module installed therein;
    a removable hard disk module, installed in the second heat dissipating area;
    a plurality of second vents, formed through the base plate of the computer case in the second heat dissipating area; and
    a plurality of gate-shaped holes, formed through the rear plate of the computer case in the second heat dissipating area, wherein a second fan is installed in front of the gate-shaped holes,
    wherein heat flows are formed in the first heat dissipating area and the second heath dissipating area respectively.

9. The system as claimed in claim 8, further comprising:
    a USB (universal series bus) interface slot, installed in the first heat dissipating area;

a memory module, installed in the first heat dissipating area;

a plurality of first vents, formed through the base plate of the computer case in the first heat dissipating area, wherein a first heat sink module is installed on the plurality of first vents; and a plurality of slots, formed through a left side of the cover of the computer case in view of facing the front plate in the first heat dissipating area.

10. The system as claimed in claim 8, wherein the power supply module is installed upside down.

11. The system as claimed in claim 8, further comprising:
a third heat dissipating area, formed inside the computer case between the first heat dissipating area and the second heat dissipating area.

12. The system as claimed in claim 11, wherein the third heat dissipating area has a mother board and a disk player connected on the top of the mother board.

13. The system as claimed in claim 12, wherein a chip set and a CPU are installed on the mother board opposite to the disk player.

14. The system as claimed in claim 13, wherein a second heat sink module having a fixing frame, a heat bulk, a heat pipe, and a plurality of heat sinks is installed on the CPU, and the heat bulk is flatly fixed on the CPU by the fixing frame.

15. A heat dissipating system of a multi-media computer, comprising:
a computer case;
a first heat dissipating area, formed on an inner side of the computer case, wherein a hard disk drive, a video graphics card, and a TV tuner card are installed therein;
a second heat dissipating area, formed on the other inner side of the computer case, wherein a power supply module is installed therein; and
a third heat dissipating area, formed inside the computer case between the first heat dissipating area and the second heat dissipating area,
wherein heat flows are formed in the first heat dissipating area and the second heat dissipating area respectively, and wherein the third heat dissipating area has a mother board and a disk player connected on the top of the mother board.

16. The system as claimed in claim 15, wherein the computer case has a front plate, a rear plate, a base plate, and a cover.

17. The system as claimed in claim 16, further comprising:
a USB (universal series bus) interface slot, installed in the first heat dissipating area;
a memory module, installed in the first heat dissipating area;
a plurality of first vents, formed through the base plate of the computer case in the first heat dissipating area, wherein a first heat sink module is installed on the plurality of first vents; and
a plurality of slots, formed through a left side of the cover of the computer case in view of facing the front plate in the first heat dissipating area.

18. The system as claimed in claim 15, further comprising:
a removable hard disk module, installed in the second heat dissipating area;
a plurality of second vents, formed through the base plate of the computer case in the second heat dissipating area; and
a plurality of gate-shaped holes, formed through the rear plate of the computer case in the second heat dissipating area, wherein a second fan is installed in front of the gate-shaped holes.

19. The system as claimed in claim 15, wherein the power supply module is installed upside down.

20. The system as claimed in claim 15, wherein a chip set and a CPU are installed on the mother board opposite to the disk player.

21. The system as claimed in claim 20, wherein a second heat sink module has a fixing frame, a heat bulk, a heat pipe, and a plurality of heat sinks is installed on the CPU, and the heat bulk is flatly fixed on the CPU by the fixing frame.

* * * * *